United States Patent
Cotton

(10) Patent No.: US 11,124,127 B2
(45) Date of Patent: Sep. 21, 2021

(54) VEHICLE ROOF RACK MOUNTABLE UTILITY INCLUDING STRUCTURE FOR MOUNTING WITH VERTICAL AND/OR HORIZONTAL RACK ELEMENTS

(71) Applicant: Yakima Products, Inc., Lake Oswego, OR (US)

(72) Inventor: Joel B. Cotton, Santa Fe, NM (US)

(73) Assignee: Yakima Products, Inc., Lake Oswego, OR (US)

( * ) Notice: Subject to any disclaimer, the term of this patent is extended or adjusted under 35 U.S.C. 154(b) by 0 days.

(21) Appl. No.: 16/350,506

(22) Filed: Nov. 21, 2018

(65) Prior Publication Data
US 2019/0092248 A1    Mar. 28, 2019

Related U.S. Application Data

(63) Continuation-in-part of application No. 14/545,003, filed on Mar. 16, 2015, now abandoned.

(51) Int. Cl.
| | |
|---|---|
| *B60R 9/04* | (2006.01) |
| *B60K 15/067* | (2006.01) |
| *B60K 15/035* | (2006.01) |
| *B60K 15/01* | (2006.01) |
| *B60R 15/02* | (2006.01) |
| *B60K 15/03* | (2006.01) |
| *B60K 15/063* | (2006.01) |

(52) U.S. Cl.
CPC ............. *B60R 9/04* (2013.01); *B60K 15/01* (2013.01); *B60K 15/035* (2013.01); *B60K 15/067* (2013.01); *B60R 15/02* (2013.01); *B60K 2015/03118* (2013.01); *B60K 2015/0639* (2013.01)

(58) Field of Classification Search
CPC .......... B60R 9/04; B60R 15/01; B60R 15/02; B60R 15/067; B60R 15/035; B60R 2015/03118
See application file for complete search history.

(56) References Cited

U.S. PATENT DOCUMENTS

| | | | |
|---|---|---|---|
| 6,152,707 A | * | 11/2000 | Alberg .................... E03B 11/06 417/423.3 |
| 7,475,799 B2 | | 1/2009 | Schaefer |
| 8,225,436 B1 | * | 7/2012 | Cotton .................... B60R 15/02 4/597 |
| 9,629,508 B2 | | 4/2017 | Cotton |
| 2003/0097710 A1 | | 5/2003 | Adrian |

(Continued)

FOREIGN PATENT DOCUMENTS

| | | | | |
|---|---|---|---|---|
| AU | 2016276603 | * | 12/2017 | ............... B60R 9/00 |
| KR | 2018-7000204 A | * | 10/2018 | ............... B60R 9/05 |
| WO | WO 2006004853 | * | 1/2006 | ............. B60R 9/042 |

*Primary Examiner* — Tung S Lau
(74) *Attorney, Agent, or Firm* — Kolisch Hartwell, P.C.

(57) ABSTRACT

A storage and conveying utility that is mountable to elements of a vehicle roof rack is disclosed. The utility includes a carrier having first and second parallel elongated slots formed therein and different walls thereof for mounting at either one or both of vertical and/or horizontals elements. In its embodiment for use in water storage, dispensing and conveyance a heating assembly is attachable thereto at the slots. A removable insulating cover assembly is provided.

15 Claims, 10 Drawing Sheets

(56) References Cited

U.S. PATENT DOCUMENTS

2006/0000860 A1* 1/2006 Pieciak ................ B60R 9/042
                                                        224/319
2015/0060467 A1* 3/2015 Cotton ................ A47K 3/285
                                                        220/562

* cited by examiner

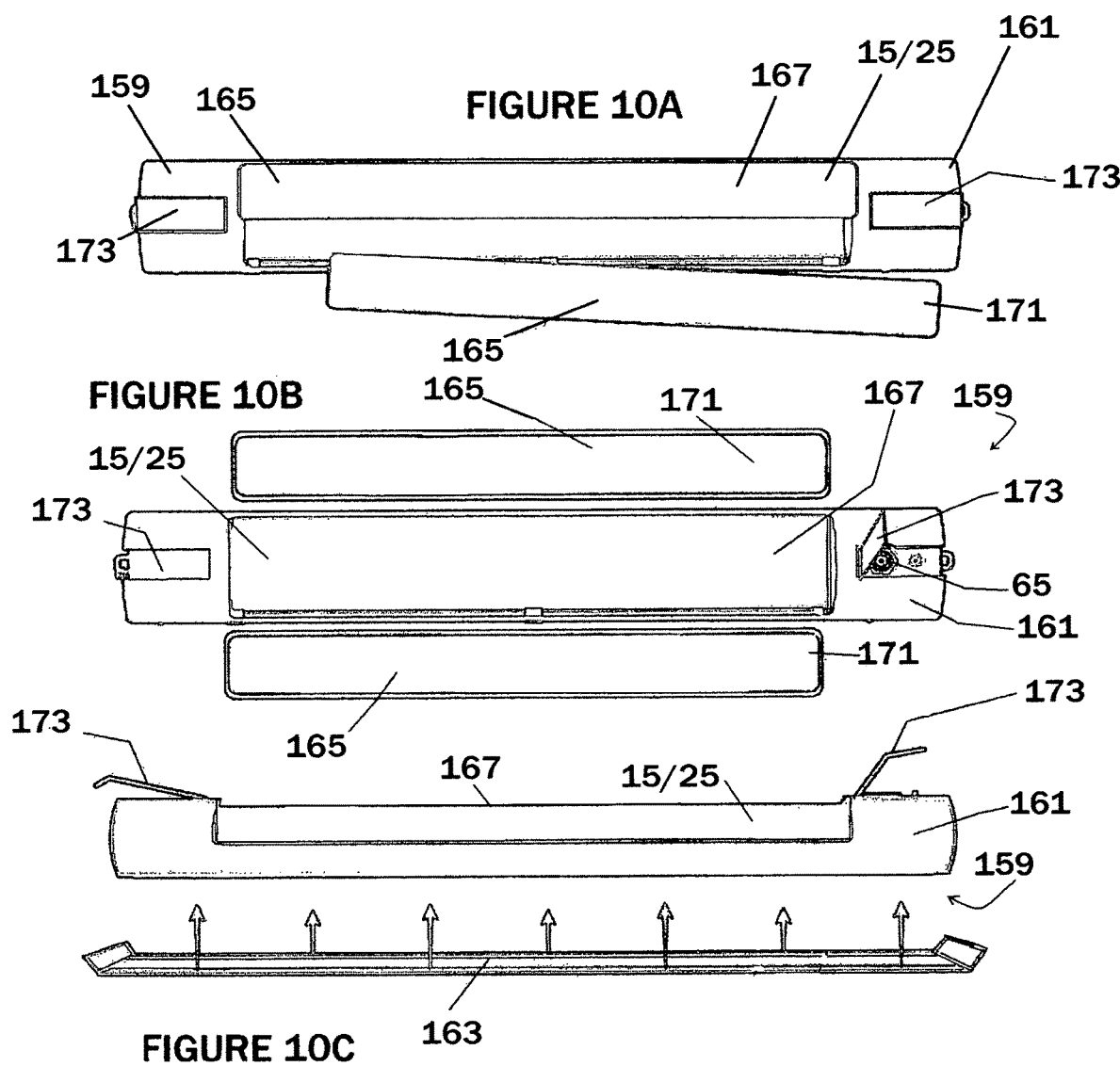

VEHICLE ROOF RACK MOUNTABLE UTILITY INCLUDING STRUCTURE FOR MOUNTING WITH VERTICAL AND/OR HORIZONTAL RACK ELEMENTS

FIELD OF THE INVENTION

This invention is related to vehicle roof rack mountable equipment and, more particularly, relates to roof rack mountable containers such as those adapted for storing and dispensing.

BACKGROUND OF THE INVENTION

A wide variety of apparatus are known and/or utilized that are mountable and retained atop vehicle roof racks for storing and conveying various equipment and/or materials. In particular such apparatus have been conceived for storing and dispensing water for use at remote locations, for example as field showers and the like (see, for example, U.S. Pat. Nos. 9,629,508 and 8,225,436 pertaining to rack mountable solar shower apparatus). Various rack elements have been utilized to achieve mounting (see the above-referenced U.S. patents as well as U.S. Patent Publication No. 2006/0000860 for examples), though mounting orientations and structures have heretofore tended to be limited by rack top configuration and/or tie down or strapping requirements in relation thereto.

Various means have also been heretofore suggested and or utilized in conjunction with portable liquid storing and carrying apparatus for treating (heating for example) the ported liquids (see, for example, U.S. Pat. No. 6,152,707 and U.S. Patent Publication No. 2003/0097710). However, such means have often been unduly complex and/or difficult to manufacture, or have been cumbersome requiring separate deployment and storage.

A variety of other shortcomings of heretofore known storing and dispensing apparatus have also been identified related to overall utility, storage and deployment of such apparatus, and in particular regarding ease of filling and dispensing, orientation limitations for usage, and equipment protection and insulation. Further improvements to such apparatus could thus still be utilized.

SUMMARY OF THE INVENTION

This invention provides vehicle roof rack storage and conveying utility that is mountable to variously-oriented mounting surfaces and that is simple to manufacture and deploy and is relatively compact and easily maintained. The storage and conveying utility is mountable to elements of a vehicle roof rack and includes a carrier having an exterior surface and an elongated internal storage volume extending between first and second carrier ends. At least a first opening accessing the storage volume through the exterior surface of the carrier is provided, a first elongated slot (preferably a t-slot) being formed at the carrier and extending between the ends thereof.

The slot is accessible through the exterior surface for slidably receiving first securement hardware utilized to selectively mount the carrier atop the roof rack and/or to mount other equipment to the carrier. A second elongated slot is formed at the carrier extending between the ends and spaced from the first elongate slot. The second slot is likewise accessible through the exterior surface for selectively slidably receiving second securement hardware for mounting the carrier beside the roof rack and/or to mount other equipment to the carrier. The second elongated slot is located parallel to the first elongated slot and is oriented perpendicularly with respect thereto.

In one preferred embodiment a water storage, conveying and dispensing utility is provided wherein the first opening is located at a the top wall of the carrier, a second opening is located at an end wall of the carrier and a third opening is located the opposite end wall of the carrier. First and second dispensing hose and nozzle assemblies are releasably securable at the second and third openings and a pressure relief fill cap is receivable at the first opening. An air intake valve through one of the carrier walls is provided for air input to the volume.

The carrier of the utility of this invention is made of coated, anodized, or painted heat conductive material selected and treated to promote solar absorption and may include a heat insulating cover. The cover has an upper section receivable over the top, ends and sides of the carrier and a lower section receivable over the bottom wall and securable to the upper section. The upper section may be constructed with at least a first removable flap (preferably tow flaps) for exposing the top wall of the carrier through a flexible material window.

For water carrying utilities of this invention particularly adapted to provide remote shower facilities, a burner assembly may be provide that includes a burner, a fuel supply line having a source connector at one end and that is connected to the burner at an opposite end, and a housing maintaining the burner and one part of the supply line therein. The housing includes a heat plate at an upper surface thereof with mounting openings at opposite ends for receipt of mounting hardware. The mounting hardware is in turn receivable in the first slot of the carrier thereby positioning the heat plate in contact with the carrier.

It is therefore an object of this invention to provide an improved vehicle roof rack mountable utility.

It is another object of this invention to provide a storage and conveying utility that is mountable to variously oriented mounting surfaces and is therefor not limited by rack top configuration and/or tie down or strapping requirements.

It is still another object of this invention to provide a storage and conveying utility that is readily mountable at either or both vertical and horizontal roof rack elements.

It is yet another object of this invention to provide a water storage, dispensing and conveying utility that includes a mountable heating assembly that is simple to manufacture and deploy and is relatively compact and easily maintained.

It is yet another object of this invention to provide a storage and conveying utility mountable to elements of a vehicle roof rack that includes a carrier having an exterior surface and an elongated internal storage volume extending between first and second carrier ends, at least a first opening accessing the storage volume through the exterior surface, at least a first elongated slot formed at the carrier extending between the ends and accessible through the exterior surface for slidably receiving first securement hardware utilized for selectively mounting the carrier atop the roof rack to at least one of the elements, and at least a second elongated slot formed at the carrier extending between the ends and spaced from the first elongate slot and accessible through the exterior surface for selectively slidably receiving second securement hardware for mounting the carrier beside the roof rack to at least one of the elements.

It is another object of this invention to provide a water storage, conveying and dispensing utility mountable to elements of a vehicle roof rack that has a carrier having an exterior surface and an elongated internal storage volume extending between first and second carrier end walls, the carrier further defined by a bottom wall extending between the end walls, a top wall extending between the end walls, and first and second arcuate side walls between the top and bottom walls and extending between the end walls, a first opening at the top wall accessing the storage volume through the exterior surface at the top wall, a second opening at the first end wall accessing the storage volume, a third opening at the second end wall accessing the storage volume, at least a first elongated slot formed at the bottom wall of the carrier extending between the end walls and accessible through the exterior surface for slidably receiving first securement hardware utilized for selectively mounting the carrier atop the roof rack to at least one of the elements, and at least a second elongated slot parallel to the first elongated slot formed at one of the side walls of the carrier extending between the end walls and accessible through the exterior surface for selectively slidably receiving second securement hardware for mounting the carrier beside the roof rack with at least one of the elements, first and second dispensing hose and nozzle assemblies releasably securable at the second and third openings, a pressure relief fill cap receivable at the first opening, and an air intake valve through one of the carrier walls for air input to the volume.

It is still another object of this invention to provide a water storage, conveying and dispensing utility mountable to elements of a vehicle roof rack that includes a solar heat absorbing carrier, a dispensing hose and nozzle assembly, and a heat insulating cover including an upper section receivable over the top, ends and sides of the carrier and a lower section receivable over the carrier bottom and securable to the upper section, the upper section of the cover having first and second removable flaps with a flexible window therebelow for exposing the carrier to the sun.

It is yet another object of this invention to provide a storage and conveying utility mountable to elements of a vehicle roof rack that includes a carrier having an exterior surface and an elongated internal storage volume extending between first and second carrier ends, first and second openings accessing the storage volume through the exterior surface, a first elongated t-slot formed at the carrier extending between the ends and accessible through the exterior surface, the t-slot accessible at termini thereof and at an expanded opening intermediate the termini for slidably receiving securement hardware therein utilized for selectively mounting the carrier at the roof rack to at least one of the elements, and a burner assembly including a burner, a fuel supply line having a source connector at one end and connected to the burner at an opposite end, and a housing maintaining the burner and one part of the supply line therein, the one end of the supply line extending through a first opening at the housing, the housing including a heat plate at an upper surface thereof with mounting openings at opposite ends thereof for receipt of mounting hardware therethrough, the mounting hardware receivable at the t-slot thereby positioning the heat plate in contact with the carrier.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 10A through 10C are various views of an insulating cover system for the utility of this invention shown in FIG. 2.

DESCRIPTION OF THE INVENTION

Storage, dispensing and conveying utility 15 is illustrated in FIGS. 1 through 5, 7 and 8. The utility is selectively mountable to elements 17 (cross bars, for example) of roof rack 19 affixed to vehicle 21 (as shown in FIGS. 2, 5, 7 and 8). While the preferred embodiments of this invention shown in the FIGURES show a unit adapted for remote site water supply, and particularly adapted for remote site shower facilities, it should be understood that various other known types of roof top mountable storage and conveying utilities could incorporate and utilize some of the improvements and inventions claimed herein.

Figure 1:
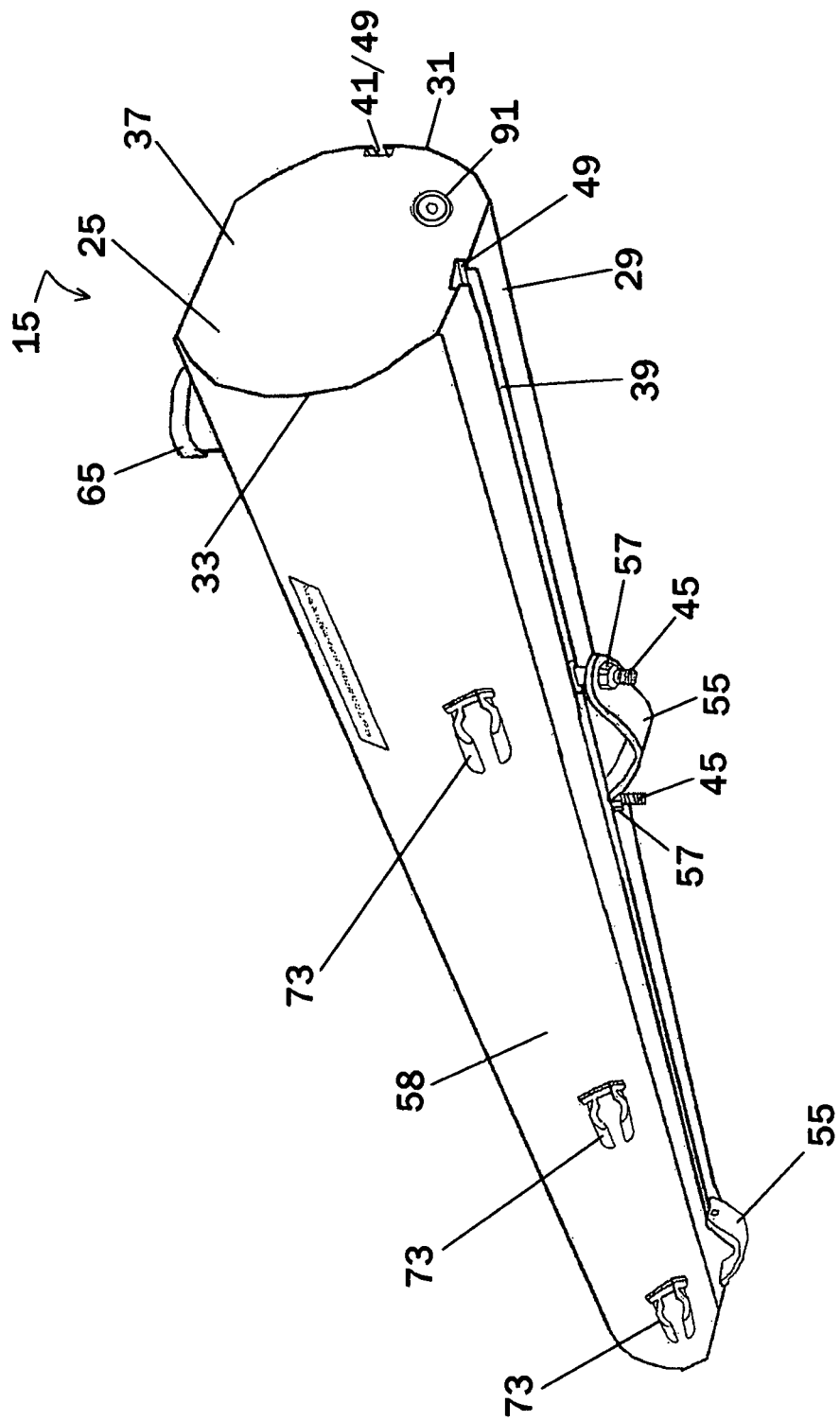
FIG. 1 is a perspective view illustrating a preferred embodiment of the carrier, or vessel, of the utility of this invention (in the particular case of a portable solar shower mountable for carriage at a vehicle roof rack)
Figure 2:
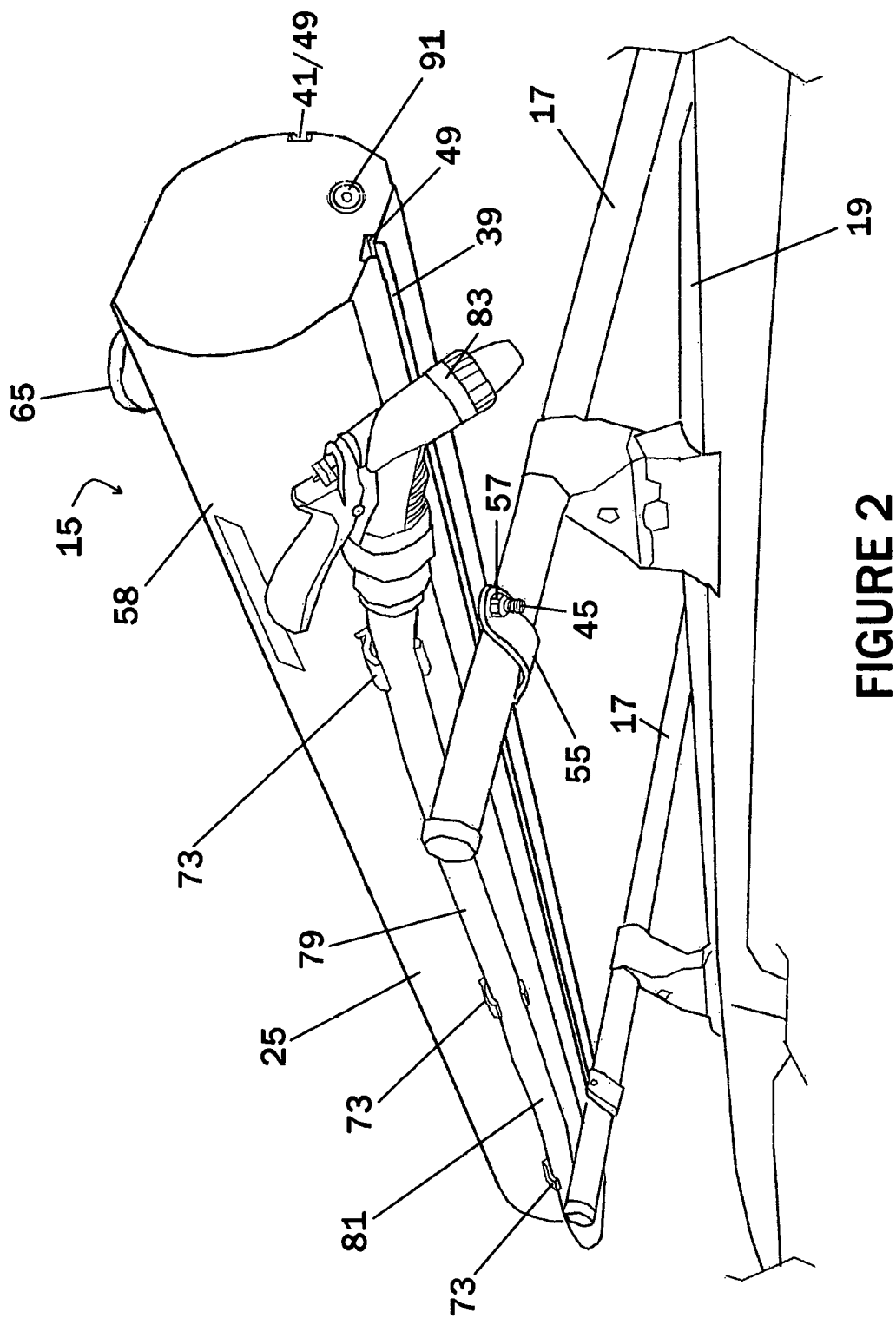
FIG. 2 is another perspective view of the preferred embodiment of the utility of this invention mounted on a vehicle roof rack.
Figure 3:
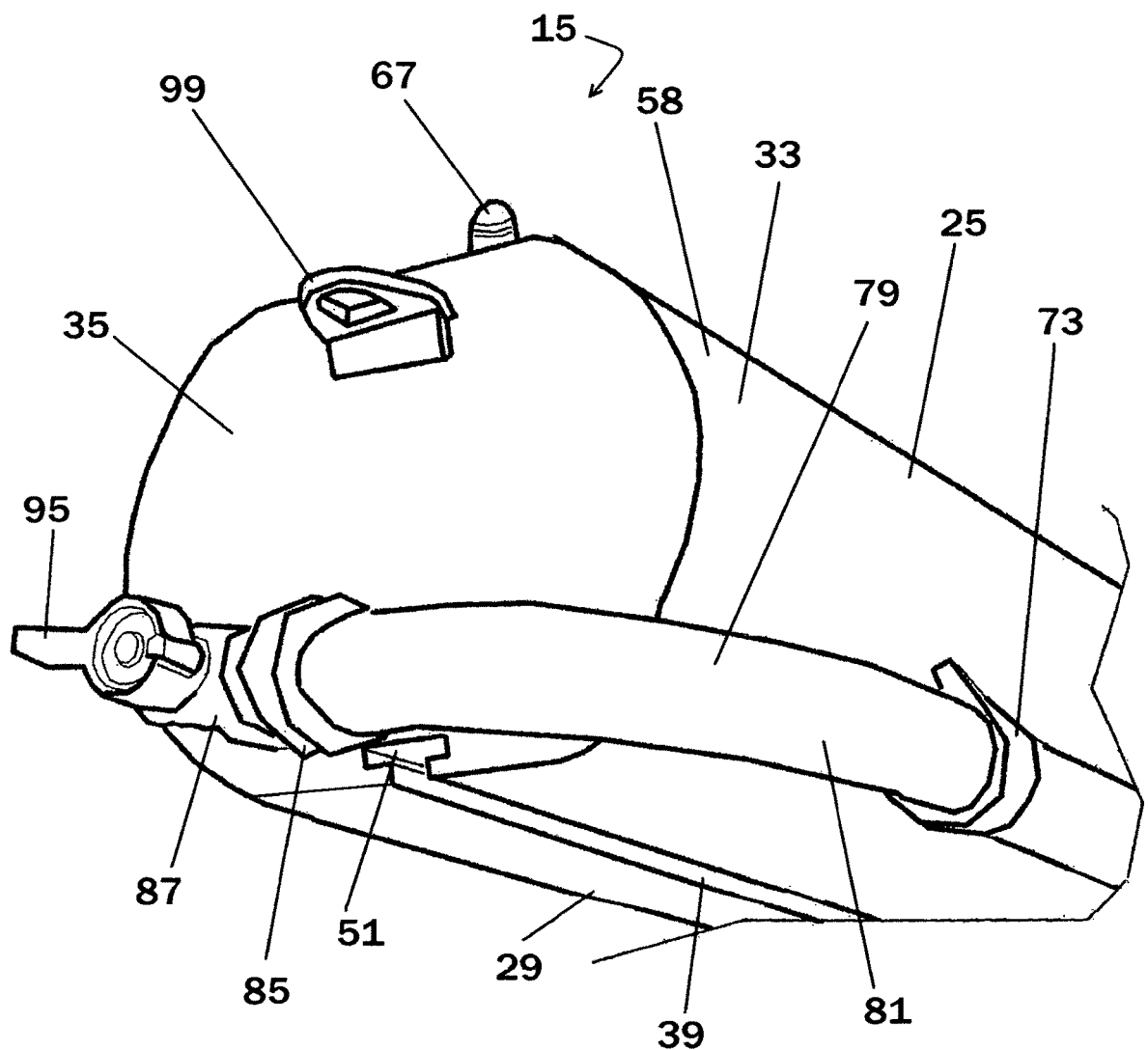
FIG. 3 is a partial end view of the utility of FIG. 2.
Figure 4:
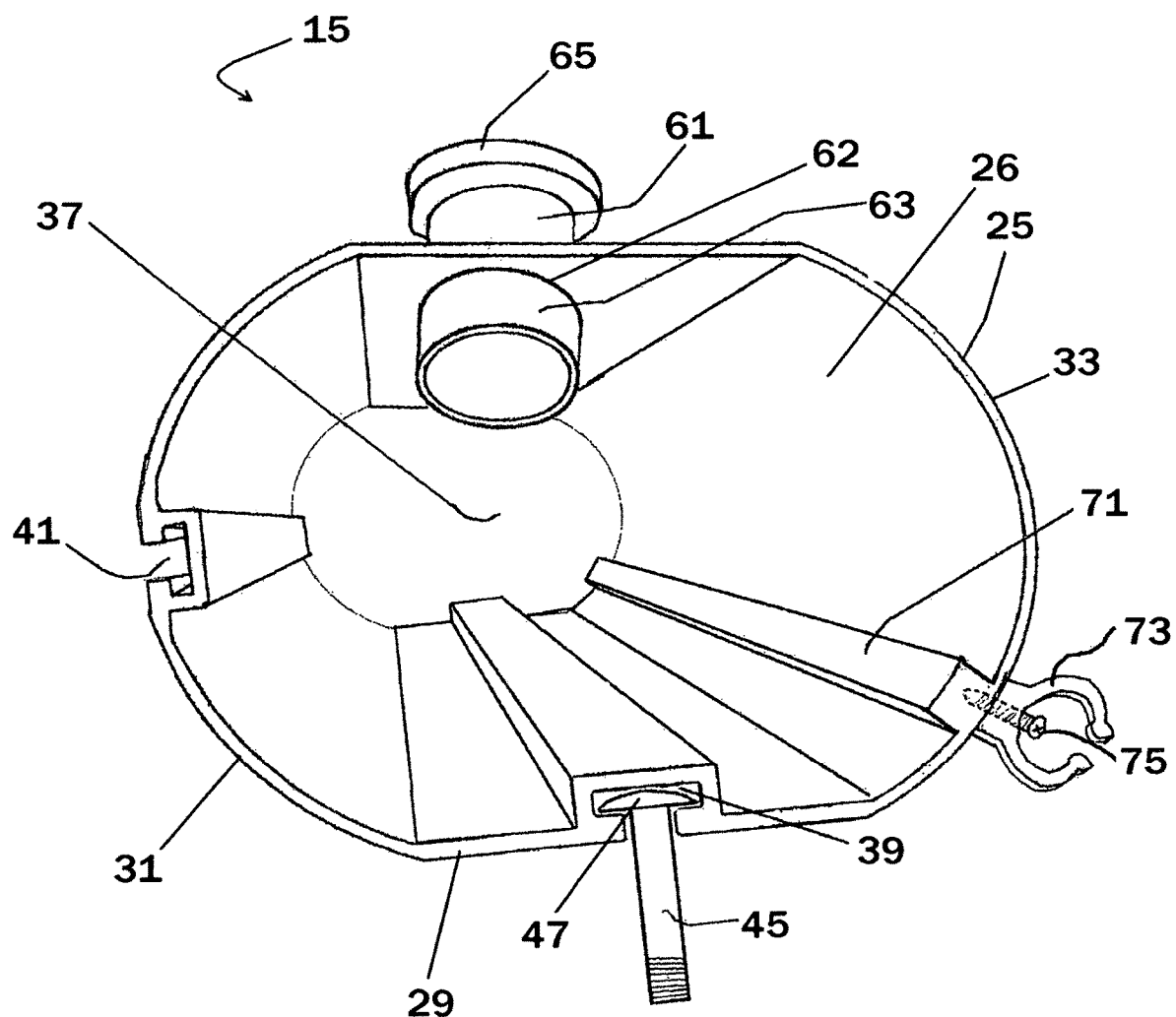
FIG. 4 is a sectional illustration of the utility of this invention.

As shown in FIGS. 1 through 4, utility 15 includes carrier (or vessel) 25 having an internal elongated storage volume 26 defined by top wall portion 27, bottom wall portion 29, arcuate side wall portions 31 and 33 and end wall portions 35 and 37. Carrier 25 is mountable at cross bar elements 17 using elongated slot 39 in bottom wall 29 and/or elongated slot 41 in side wall 31. The illustrated slots are preferably t-slots running the length of carrier 25 (though other slot configurations could be utilized). Thus the slots are substantially parallel to each other but deployed operationally perpendicularly to each other (i.e., relative to their cross sections as shown in FIG. 4) in their respective walls thereby enabling mounting to either or both horizontally or vertically arrayed rack elements (see FIGS. 2 and 5). Mounting bolts 45 having heads 47 that are slidably received in a selected slot 39 or 41 through either of slot termini 49 or 51 or through expanded opening 53 intermediate the termini positioned through openings in each end of clamp brackets 55 positioned across the opposite side of the selected rack element 17. Brackets 55 are secured thereto by threaded nuts 57 receivable on mounting bolts 45.

Carrier 25 is preferably made of a metal material (preferably aluminum) exhibiting high heat conductivity and is painted, coated, or anodized black or other dark color at outer surface 58 to further enhance solar absorption. Slots 39 and 41 are integrated (i.e., welded for example) in their respected wall portion. Carrier cross sectional shape is preferably that of a somewhat flattened elliptical tube to enhance top wall portion surface area. End wall portions 35 and 37 are preferably flat metal plates welded to each end carrier 25. Sunlight heats the carrier when exposed thereby heating carrier contents.

Filler neck 61 is welded to carrier 25 at volume access opening 62 therein, and is preferably threaded at its top portion, terminating opposite at interior drop down tube 63 in the carrier volume (see FIG. 4). Threaded filler cap 65 includes a spring biased pressure relief system integrated therein. In the case of a liquid transporting carrier utility 15, this arrangement allows filling a refilling of carrier volume 26. Drop down tube portion 63 extends a selected distance into volume 26 of carrier 25 to prevent overfilling of the volume and creating a pressurizable air pocket at the volume top. Air pocket is accessible for periodic pressurization by a user via air intake valve 67 (a SCHRADER valve or the like using a pump or compressor).

Internal rib 71 is integrally established at wall portion 33 (welded for example) so that hose clips 73 can be fastened via threaded opening therein to carrier 25 using screws 75 without puncturing the vessel itself. Hose and nozzle assembly 79 includes flexible hose 81 and low volume high pressure spray head 83, clips 73 adapted for receiving and releasably holding hoses 81. Assembly 79 is receivable via quick connect/disconnect 85 to on/off mating quick disconnect valve assembly 87 mounted in carrier openings 91 and 93 (one or both at either end on carrier 25—see FIGS. 2, 3 7 and 8). Assembly 87 includes shut off handle 95 thereat for flow control, and one or both of spray heads 83 may also include flow control mechanisms 97 (see FIG. 8). Providing dispensing outlet opening 91/93 at both ends of carrier 25 assures dispensing, especially of the final amount of liquid contained in volume 26, without regard to vehicle tilt (location on unlevel surfaces). Locking loop 99 is welded to one of end wall portions 35 or 37 for receipt of a pad lock and cable looped through the roof rack for anti-theft protection.

Figure 5:
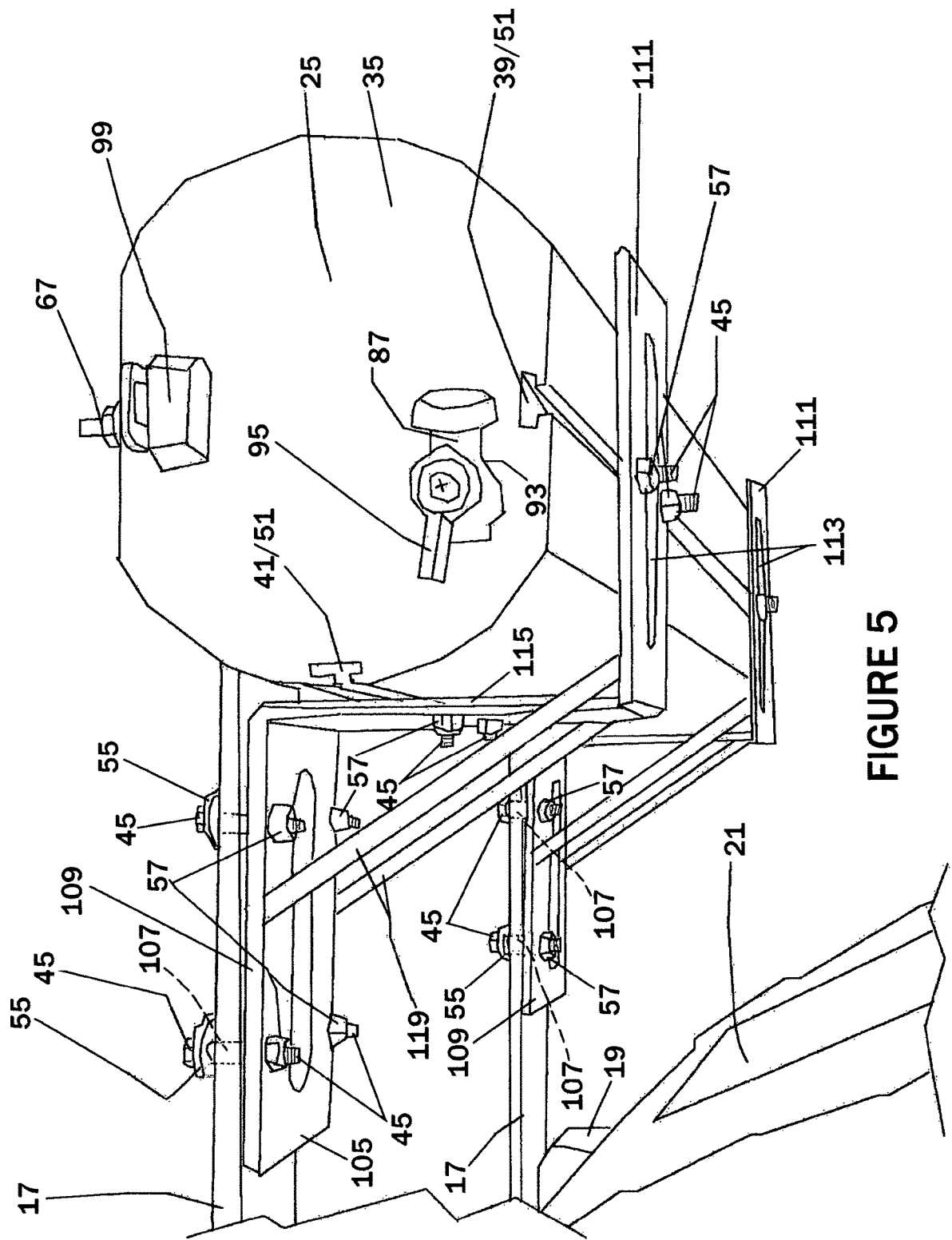
FIG. 5 is an opposite end view illustration of the utility of this invention and a unique mounting adaptation thereof.
Figure 6:
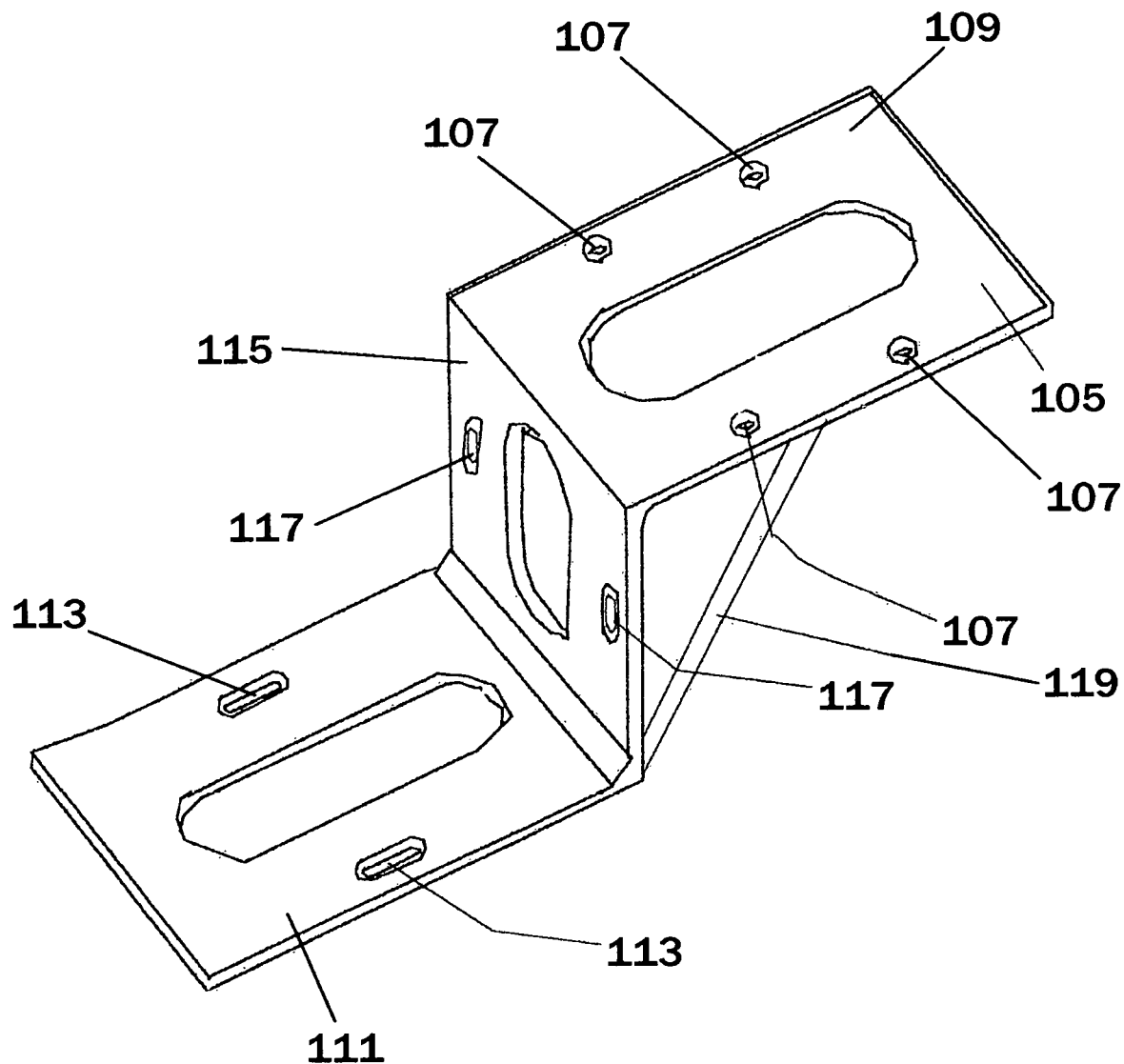
FIG. 6 is a perspective view of a bracket of this invention configured for the mounting adaptation of FIG. 5.
Figure 7:
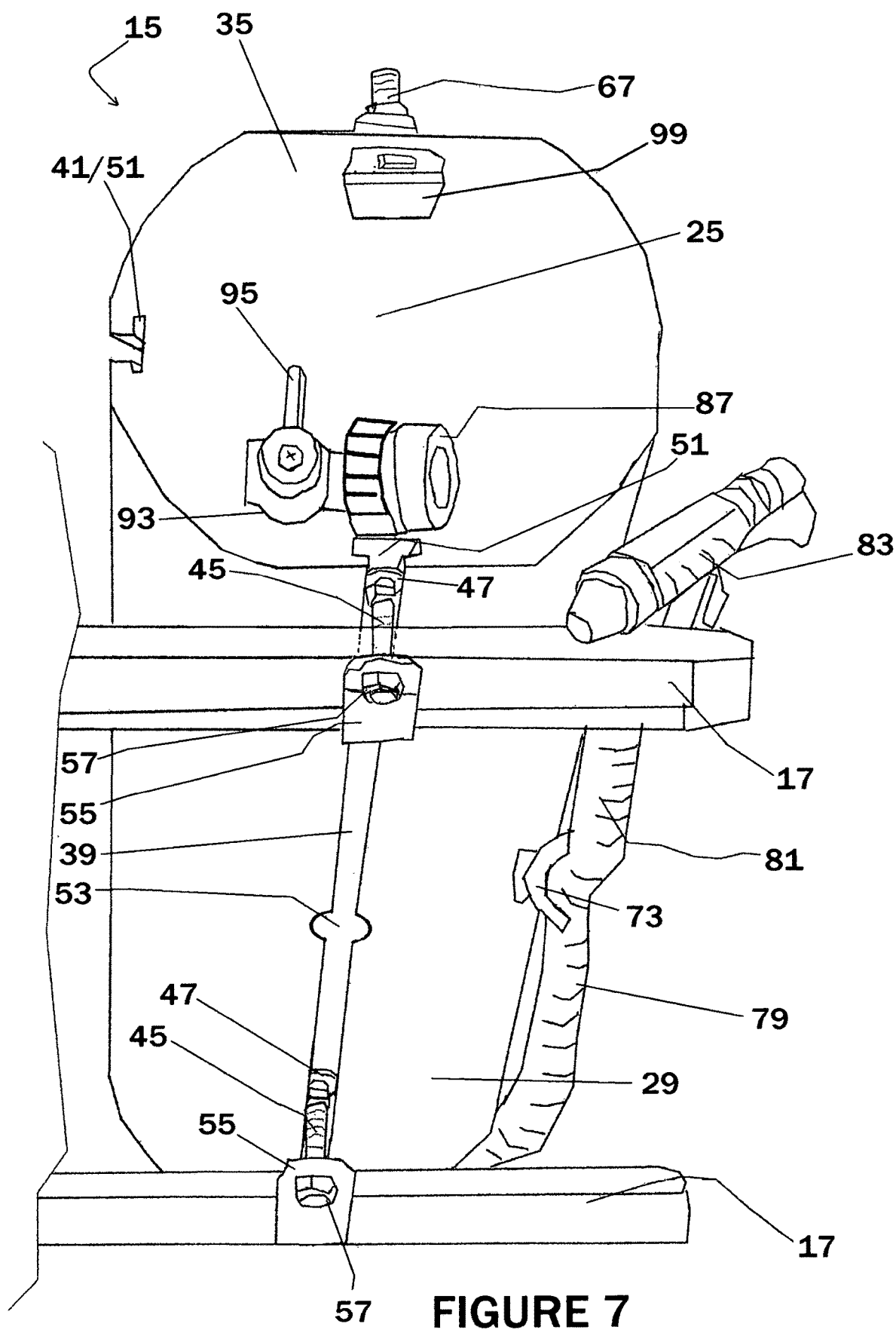
FIG. 7 is a perspective view drawing illustrating the bottom of the utility of this invention.
Figure 8:
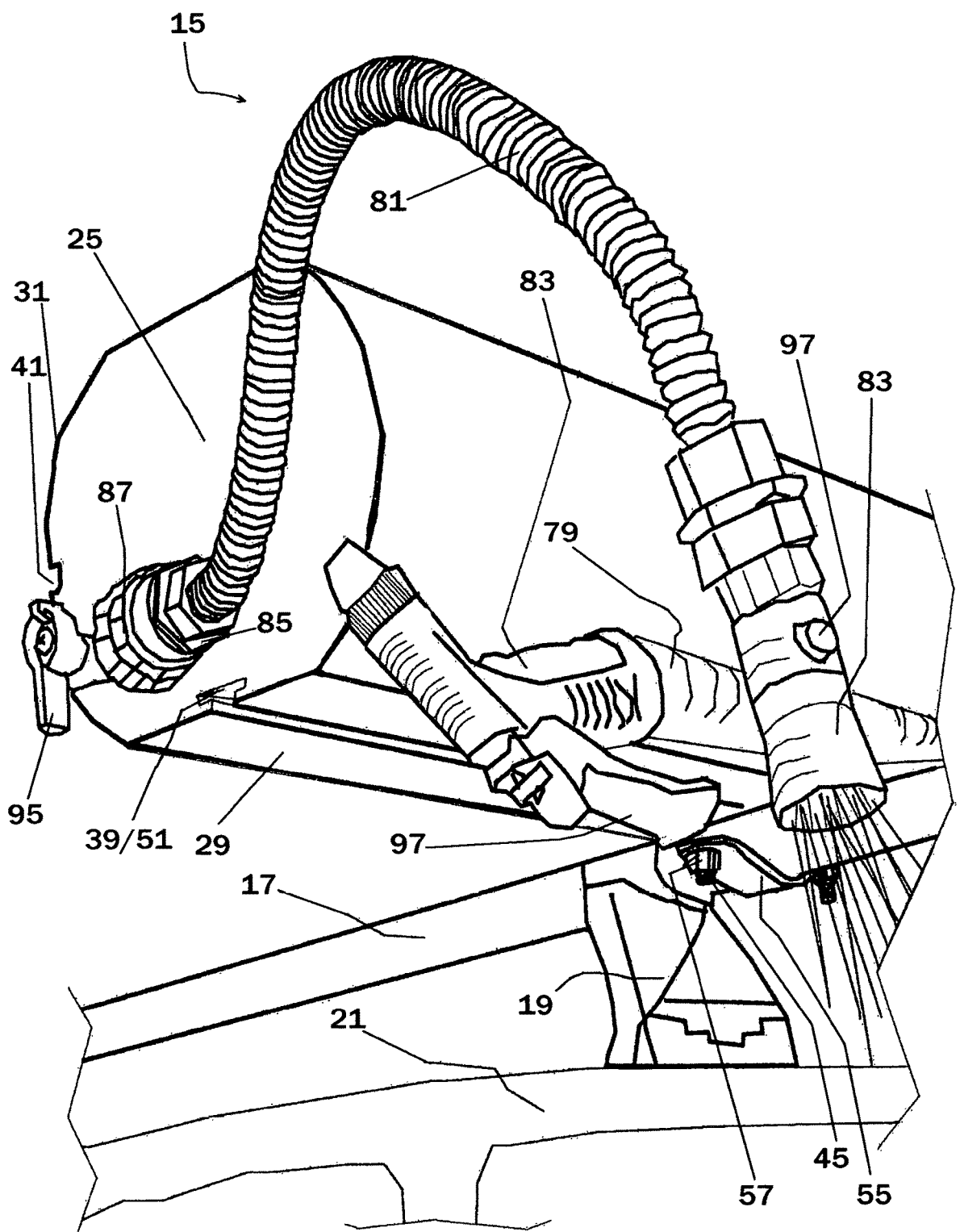
FIG. 8 is a partial perspective view drawing illustrating use of one configuration of an embodiment of the utility of this invention.

Turning now to FIGS. 5 and 6, use of Z-bracket (or otherwise configured bracket element) 105 for below roof top rack mounting (i.e., for holding utility 15 under cross bars elements 17). Since roof racks are used to carry a variety of cargo such as roof top tents and other accessories, there may be no room for utility 15 atop roof rack 19. Moreover, in the case of tall vans for example, sometimes a user will want the utility to be located closer to the ground for ease of use. Bracket elements 105 are mounted at the underside of roof rack elements (cross bars) 17 using brackets 55 and bolt/nut 45/57 combinations as discussed hereinabove through openings 107 in bracket rack mounting extensions 109. Horizontal carrier mounting extensions 111 are spaced from but parallel to rack mounting extensions 109 and have receiving slots 113 therethrough for receipt of mounting hardware as heretofore describe, the mounting hardware receivable at elongated slot 39 as heretofore described. Vertical carrier mounting extensions 115 extend between and perpendicular to the other two extensions and having receiving slots 117 therethrough for receipt of mounting hardware. In this case heads 47 of bolts 45 are received in elongated slot 41. For this construction, it is preferred that bracket elements 105 are braced using diagonal bars 119.

Figure 9B:
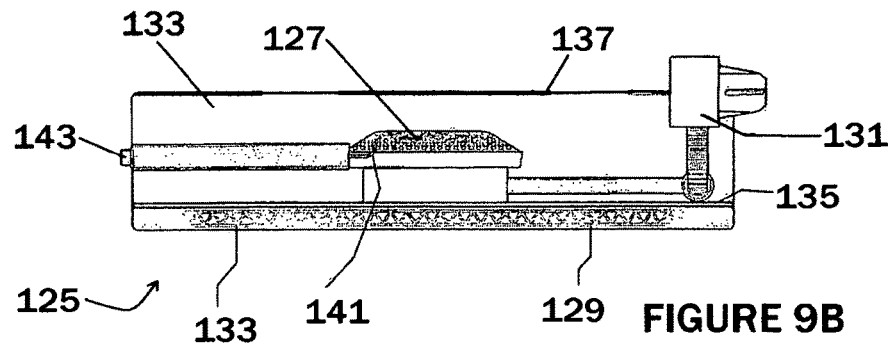
FIGS. 9A through 9C are illustrations of a liquid heating system for the utility of this invention shown in FIG. 2.
Figure 9A:
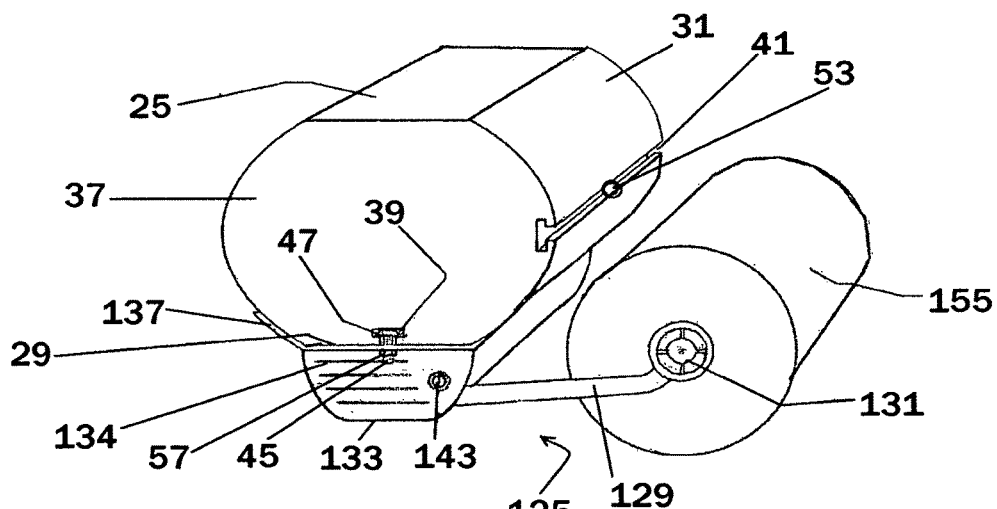
Figure 9C:
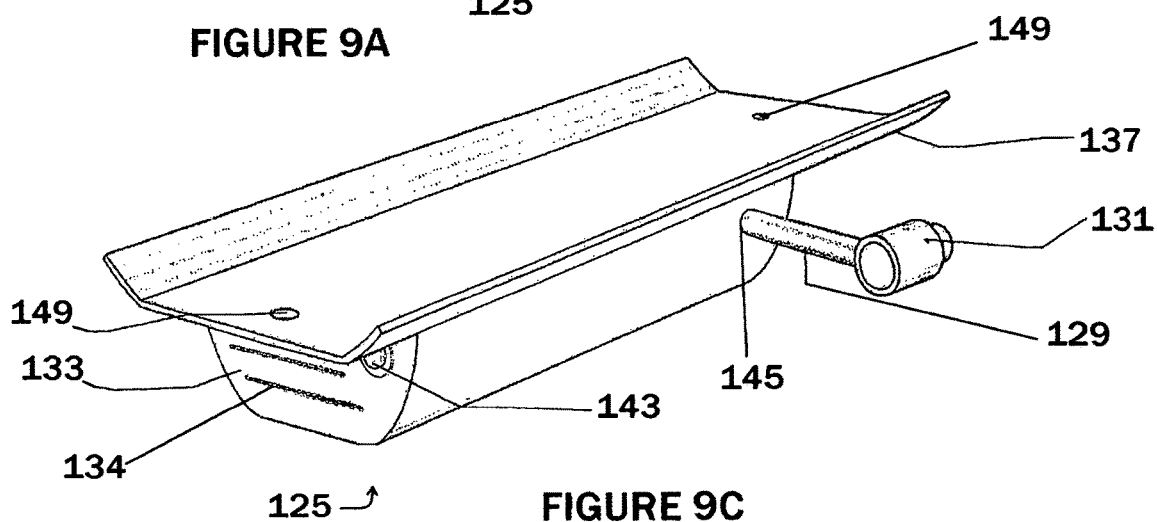

As shown in FIGS. 9A through 9C, burner assembly 125 may be provided to heat volume 26 of carrier 25. Assembly 125 includes burner 127, fuel supply line 129 having fuel source connector 131 at one end and connected to the burner at an opposite end, and housing 133 having air supply vents 134 at one end thereof. Housing 133 includes steel plate insulator 135 and upper surface heat plate 137, and is preferably lined with reflective foil insulation at its bottom portion. Igniter coil 141 and igniter button switch 143 may also be provided. Housing 133 maintains burner 127 and a part of the supply line 129 therein, the end of the supply line extending through opening 145 at housing 133. Heat plate 137 has mounting openings 149 at opposite ends thereof for receipt of mounting hardware therethrough, the mounting hardware (utilized as heretofore described) receivable at slot 39 to thereby position heat plate 137 in contact with carrier 25 at bottom wall portion 29 thereof. The heat plate transfers heat to carrier 25 while protecting the carrier from scorching. Propane tank 155 is mountable with and supported/maintained by fuel supply line 129 at source connector 131 closely adjacent to burner assembly housing 133.

Turning to FIGS. 10A through 10C, a heat insulating (neoprene for example) cover 159 is illustrated for holding heat in the tank when no solar or other heating source is applied. Since a solid cover would require frequent carrier removal to change the cover, a multipart cover is illustrated herein that can stay in place on utility 15. Heat insulating cover 159 includes upper section 161 receivable over the top wall portion, end wall portions and side wall portions of carrier 25 and lower section 163 receivable over the bottom wall portion of the carrier and securable to upper section 161 (using VELCRO strips, for example). First and second removable flaps 165 are provided at the top of upper section 161 (again secured by VELCRO strips, for example) below which a flexible clear (vinyl, for example) window 167 is exposed that is secured to the upper section. This arrangement is provided so that carrier 25 is able to be exposed to sunlight when available for carrier heating while being completely coverable when solar heating is less available to thereby insulate the carrier against heat loss.

Flaps 165 include reflective inner surfaces 171. In this way flaps 165 can be folded down with the bottom length still held to upper section 161 to reflect sunlight through window 167 thereby to increase solar gain. Openable and resecurable flexible doors 173 are provided for accessing fill cap 65 and air supply valve 67 in order to fill and pressurize volume 26. Lower section 163 is provided in one long unit to the user, but must be cut into sections by the user to accommodate the mounting elements 17 of roof rack 19.

As may be appreciated from the foregoing, this invention provides a number of advantages, including enhanced mounting flexibility, over heretofore known roof top mountable carriers. This is particularly so in the case of solar shower assemblies wherein water heating and heat retention has proven challenging.

What is claimed is:

1. A storage and conveying utility mountable to elements of a vehicle roof rack comprising a carrier having an exterior surface and an elongated internal storage volume extending between first and second carrier ends, at least a first opening accessing said storage volume through said exterior surface, at least a first elongated slot formed at said carrier extending between said ends and accessible through said exterior surface for slidably receiving first securement hardware utilized for selectively mounting said carrier atop the roof rack to at least one of the elements, and at least a second elongated slot formed at said carrier extending between said ends and spaced from said first elongate slot and accessible through said exterior surface for selectively slidably receiving second securement hardware for mounting said carrier beside the roof rack to at least one of the elements, wherein the carrier includes a tank having a top wall, a bottom wall and a pair of opposing side walls, said first elongated slot being located in the bottom wall, and said second elongated slot being located in one of the side walls of the tank, the slots being configured to provide optional attachment of the carrier: (a) directly on top of a pair of crossbars using only the first elongated slot, and alternatively (b) to a Z-shaped bracket using both the first and second elongated slots.

2. The utility of claim 1 further comprising at least a first bracket structure including a rack mounting extension securable at a roof rack mounting element, a horizontal carrier mounting extension spaced from said rack mounting extension and having receiving slots therethrough for receipt of mounting hardware therethrough, said mounting hardware receivable at said first elongated slot, and a vertical carrier mounting extension extending between and perpendicular to the other said extensions and having receiving slots therethrough for receipt of mounting hardware therethrough, said mounting hardware receivable at said second elongated slot.

3. The utility of claim 1 wherein said first and second elongated slots are positioned substantially parallel to each other.

4. The utility of claim 1 adapted for water storage and conveyance wherein said first opening is configured as a filling opening and includes a filler tube connected thereat with portions extending above and below said top wall, said portion extending below said top wall extending a selected distance into said volume so that an air pocket remains after filling, said utility further comprising a pressure relief cap receivable at said portion of said filler tube extending above said top wall and an air intake valve through said top wall communicating with said volume.

5. The utility of claim 1 wherein said carrier is made of coated, anodized, or painted heat conductive material selected and treated to promote solar absorption.

6. The utility of claim 1, wherein each of said first elongated slot and said second elongated slot is a T-slot.

7. The utility of claim 4 wherein said carrier has a second opening accessing said storage volume at said first end configured for selectively withdrawing water from said volume.

8. The utility of claim 6, wherein each of said first elongated slot and said second elongated slot extends into the elongated internal storage volume.

9. The utility of claim 6, wherein each of said first elongated slot and said second elongated slot has an opening at the exterior surface of the carrier.

10. The utility of claim 6, wherein said first elongated slot includes an expanded opening intermediate the first and second carrier ends, for receiving the first securement hardware.

11. The utility of claim 6, wherein said first elongated slot is welded in the bottom wall.

12. The utility of claim 6, wherein each of said first elongated slot and said second elongated slot is formed in an internal rib of the carrier.

13. The utility of claim 7 wherein said carrier has a third opening accessing said storage volume at said second end configured for selectively withdrawing water from said volume.

14. A storage and conveying utility mountable to a vehicle roof rack, comprising:
a carrier having an exterior surface and an elongated internal storage volume extending between first and second carrier ends, and defined by a top wall between arcuate side walls,
a filler opening accessing said storage volume through said exterior surface,
a first elongated T-slot and a second elongated T-slot integrated in said carrier, each extending between said ends, and accessible through said exterior surface for slidably receiving securement hardware, the slots being configured to provide optional attachment of the carrier: (a) directly on top of a pair of crossbars using only the first elongated T-slot, and alternatively (b) to a Z-shaped bracket using both the first and second elongated T-slots.

15. A storage and conveying utility mountable to a vehicle roof rack, comprising:
a carrier having an exterior surface and an elongated internal storage volume extending between first and second carrier ends,
a first opening accessing said storage volume through said exterior surface,
a second opening accessing said storage volume at said first end configured for selectively withdrawing water from said volume,
a first elongated T-slot and a second elongated T-slot integrated in said carrier, each extending between said ends, and accessible through said exterior surface for slidably receiving securement hardware, the slots being configured to provide optional attachment of the carrier: (a) directly on top of a pair of crossbars using only the first elongated T-slot, and alternatively (b) to a Z-shaped bracket using both the first and second elongated T-slots.

* * * * *